United States Patent
Klaus

Patent Number: 5,514,495
Date of Patent: May 7, 1996

[54] NEGATIVE ELECTRODE FOR GASTIGHT ALKALINE STORAGE BATTERIES HAVING A CARBON-BLACK-CONTAINING GAS-CONSUMPTION LAYER

[75] Inventor: Christoph Klaus, Wiesbaden, Germany

[73] Assignee: Varta Batterie Aktiengesellschaft, Hanover, Germany

[21] Appl. No.: 283,277

[22] Filed: Jul. 29, 1994

[30] Foreign Application Priority Data

Aug. 11, 1993 [DE] Germany ............... 43 26 944.3

[51] Int. Cl.$^6$ ..................... H01M 4/62
[52] U.S. Cl. ............. 429/217; 204/290 R; 204/294; 427/122; 427/427; 427/443.2
[58] Field of Search .......... 429/217, 65; 427/122, 427/384, 427, 443.2; 204/290 R, 291, 294

[56] References Cited

U.S. PATENT DOCUMENTS

| | | | |
|---|---|---|---|
| 4,255,466 | 3/1981 | Natsume et al. | 427/443.2 X |
| 4,278,825 | 7/1981 | Gestaut | 204/290 R X |
| 4,330,387 | 5/1982 | Astruc et al. | 204/294 X |
| 4,382,875 | 5/1983 | Solomon | 204/294 X |
| 4,900,642 | 2/1990 | Tomantschger | 429/59 |
| 5,043,234 | 8/1991 | Tomantschger | 429/59 |

FOREIGN PATENT DOCUMENTS

| | | |
|---|---|---|
| 2822821 | 12/1978 | Germany. |
| 3433544 | 3/1986 | Germany. |
| 3534758 | 4/1987 | Germany. |

*Primary Examiner*—Stephen Kalafut
*Attorney, Agent, or Firm*—Weiser & Associates

[57] ABSTRACT

A carbon-black-containing gas-consuming layer on the surface of a negative electrode is produced from a mixture of an aqueous carbon black dispersion and an aqueous PTFE dispersion, both of which contain a surfactant of the same type (either cationic, anionic or nonionic) for the purpose of stabilization. The stabilized particles in the final gas-consuming dispersion are formed by coating PTFE particles with smaller carbon particles, preferably with an interlayer or envelope of a surfactant film. Pores and cracks operate to increase the effective catalytic surface area for oxygen gas. Additions of polyacrylic acid esters are suitable for adjusting the viscosity of the dispersion. The dispersion is applied to the electrode by immersion or spraying.

16 Claims, 1 Drawing Sheet

0.1 μm

NEGATIVE ELECTRODE FOR GASTIGHT ALKALINE STORAGE BATTERIES HAVING A CARBON-BLACK-CONTAINING GAS-CONSUMPTION LAYER

BACKGROUND OF THE INVENTION

The present invention generally relates to a negative electrode for gastight alkaline storage batteries, and in particular, to a negative electrode having a carbon-black-containing gas-consumption layer.

It is generally desirable to charge gastight storage batteries with the highest currents possible. To this end, steps have been taken to accelerate oxygen consumption by providing the negative electrodes of such cells with auxiliary electrodes made of a catalytically active material and which are at the same potential as the negative (main) electrode.

German Offenlegungsschrift 35 34 758 shows one such electrode arrangement, for a Ni/Cd button cell. The disclosed cell comprises a negative electrode in tablet form which is pressed into a nickel-wire gauze basket, and which is composed of a carbon-containing mixture of active carbon, conductive carbon black and PTFE (which serves as a binder). The resulting mixture is rolled into the nickel-wire gauze material of the basket lid.

German Offenlegungsschrift 34 33 544 discloses a negative cadmium electrode which is directly coated with a catalytically active carbon material in dry form. Before the dry application of the carbon material (for example, by dusting), the electrode is moistened with a dispersion of a water-soluble cellulose ether (sold, for example, under the tradename "Tylose"). Cellulose ethers of this kind, such as methylcellulose or carboxymethylcellulose (which generally find application as thickeners, binders and suspending agents), in this case serve mainly as adhesives.

However, in a dry coating, certain disadvantages may arise. This is because, on the one hand, only the outer electrode surface and not the inner pores are coated and, on the other hand, irregularities are often present in the coating (thickness) which can impair the electrolyte absorption of the negative electrode. As a result, such cells require long exposure times during their production.

Wet coatings based on aqueous dispersons have also proved to be less than satisfactory because, when the cell is cyclically charged and discharged, the coating loses some of its hydrophobic nature. This results in a deterioration of the coating's gas-consumption kinetics, which are unalterably associated with the maintenance of three-phase boundary layers (including an electrically conducting solid-state surface, a gas phase and the liquid electrolyte). As a consequence, the cell tends to exhibit a high internal pressure, which contributes to a shortening of the service life of the cell. A further disadvantage of known aqueous dispersons is that they have a tendency to demix and separate the carbon component and the PTFE component.

SUMMARY OF THE INVENTION

It is therefore the primary object of the present invention to provide a negative electrode which is particularly suited to gastight NiCd and NiH cells, and which is surface-coated with carbon black for the purpose of catalytic oxygen recombination.

It is also an object of the present invention that the material for the carbon black coating should be readily and uniformly absorbed on the surface of the negative electrode.

It is also an object of the present invention that the resulting cell exhibit a long active life when in operation.

These and other objects which will be apparent are achieved in accordance with the present invention by providing a negative electrode for a gastight alkaline storage battery which has a carbon-black-containing gas-consumption layer. The carbon black component is produced by mixing an aqueous carbon black dispersion with an aqueous PTFE dispersion. A surfactant is preferably used as an emulsifier in both dispersions, and for both dispersions is uniformly either cationic, anionic or nonionic in type.

For further detail regarding the negative electrode of the present invention, reference is made to the description which is provided below, in conjunction with the following illustrations.

BRIEF DESCRIPTION OF THE DRAWINGS

In these illustrations, like reference numbers denote similar structure.

DETAILED DESCRIPTION OF PREFERRED EMBODIMENTS

Figure 1:
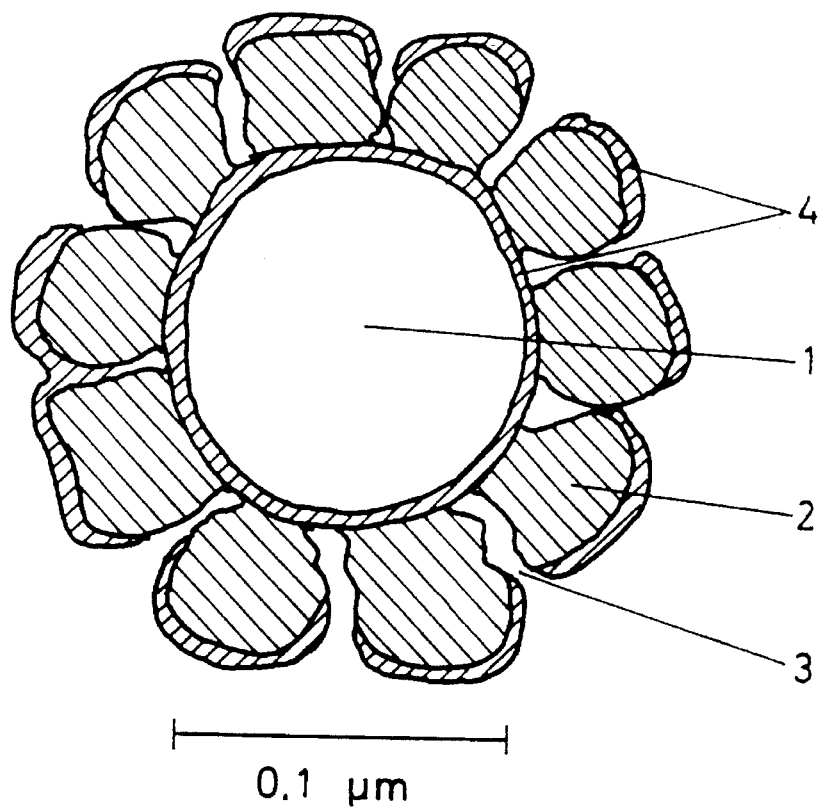
FIG. 1 is a schematic sectional view of a spherical PTFE/C particle produced in accordance with the present invention.

In accordance with the present invention, a carbon-containing gas-consumption layer is formed from a dispersion which is the mixing product of two aqueous dispersions. One of the two aqueous dispersions has a carbon black content of 1 to 20%, and preferably from 0.5 to 5%, and an added emulsifier composed of a cationic, anionic or nonionic surfactant. For this dispersion, a carbon black content of approximately 2% has been found to be exemplary. The other of the two aqueous dispersions is a PTFE dispersion containing 1 to 60% PTFE, and preferably from 2 to 20%, and also contains an emulsifier. For this dispersion, a PTFE content of approximately 10% has been found to be exemplary. In preferred embodiments, the emulsifiers in the two mixture components are of the same type in terms of their ionic activity (i.e., both are either only cationic, only anionic or only nonionic).

The carbon black used in the first mixture component preferably has a BET surface area of 200 to 2000 $m^2/g$, with a primary particle size of from 0.001 to 0.1 μm, and preferably from 0.01 to 0.07 μm. As exemplary particle size is approximately 0.05 μm. A highly suitable carbon black product is obtainable under the tradename "Akzo Ketjenblack ED 310", although other carbon black products can be used if desired. The PTFE used in the second mixture component preferably has a primary particle size of from 0.01 to 0.5 μm, and preferably from 0.05 to 0.2 μm. An exemplary particle size is approximately 0.1 μm. Suitable products are obtainable under the tradenames "Hoechst PTFE 5032" or "DuPont Teflon N30".

No flocculation or coagulation should occur during the mixing of the two dispersions. In accordance with the present invention, this is achieved by stabilizing both the carbon black dispersion and the PTFE dispersion with a surfactant of the same ionic type. In addition, a buffering of the two dispersions at the same pH markedly increases the long-term stability of the final mixture.

To achieve a uniform application of the carbon black dispersion of the present invention to the negative electrode, it is further advantageous to establish a certain dispersion viscosity. In producing known gas-consumption dispersions, the previously mentioned methylcelluloses are generally used for this purpose. As hydrophilic colloids, these additives contribute to the beneficial properties of making the aqueous dispersions more stable and, in particular, of acting as a protective colloid with respect to the PTFE. However, these additives also contribute to a loss of hydrophobicity of the electrode. It has been found that this deficiency can be eliminated by other polymers which have a thickening action and which do not behave as protective colloids. As an example, the addition of polyacrylic acid esters, such as the product obtainable under the tradename "Akzo Carbopol 941", is quite advantageous for adjusting the dispersion viscosity.

In contrast to dry mixtures, the above-described dispersions (including thickeners) can be mixed very simply, either with a desired stirring tool or by tumbling or rotating in a mixing vessel. High gravitational forces and long mixing times are not necessary. The resulting dispersion is notable for outstanding long-term stability, and neither coagulation nor demixing will occur. The result is a substantial simplification of the process used in coating the electrodes.

The stability of the dispersion of the present invention is closely related to the size and structure of its particles. During mixing, the carbon black particles (which are mostly present in aggregates having diameters of between 0.02 and 0.2 µm) are absorbed on the surface of the discrete spherical PTFE particles and, in doing so, disintegrate into numerous small primary particles or filaments of a size varying between 0.001 and 0.1 µm. The absorbed particles tend to "spread" so to speak, around the PTFE particles, enveloping the PTFE particles like a spherical shell. However, the resulting shell is not continuous, but rather is perforated by a multiplicity of fissures. The formed shell is therefore highly porous, and remains firmly bound to the PTFE surface so that a double layer is produced which is composed of hydrophobic PTFE and an outer carbon layer having a high catalytic surface area.

In addition to these spherical particles, berry-shaped particles are also typical of the dispersion of the present invention. Such particles are produced by agglomerating a few PTFE particles with an equal number of carbon particles which are about the same size, but which are themselves agglomerates of primary particles.

The two particle shapes of the dispersion of the present invention are best illustrated with reference to FIG. 1, which shows a spherical PTFE/C particle, and FIG. 2, which shows a berry-shaped PTFE/C particle.

Referring to FIG. 1, a discrete PTFE particle 1 is surrounded by a multiplicity of smaller carbon (primary) particles 2, which have been produced by the disintegration of larger aggregates during the mixing process. The diameter of the PTFE particle is, for example, 0.1 µm. The diameter of the carbon primary particles is, for example, 0.05 µm. This results in a total diameter for the PTFE/C particle of 0.2 to 0.3 µm, depending on the concentration of carbon particles in the spherical envelope.

Even as the admixture of carbon increases, the outermost layer continues to be penetrated by sufficient pores and fissures 3 to ensure an access of oxygen to the carbon particles (under the hydrophobic influence of the PTFE core). Since the PTFE core and the carbon envelope are both enclosed by a surfactant layer 4, and since the carbon envelope also has an outer surfactant layer, a sandwich-like structure is characteristic of the "primary particle" of the dispersion of the present invention. As has been demonstrated by scanning electron microscopy, the morphology of these sandwiched microaggregates may vary from irregular shapes to spherical particles (shown here in idealized form).

Figure 2:
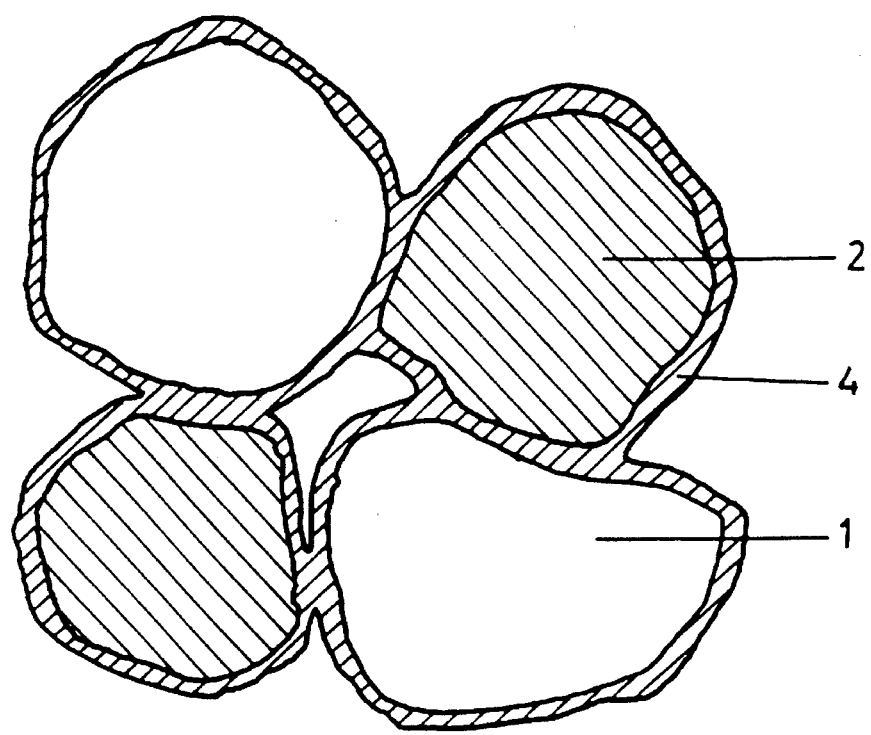
FIG. 2 is a schematic sectional view of a berry-shaped PTFE/C particle produced in accordance with the present invention.

Referring to FIG. 2, a "primary particle" with a berry-type shape (also observed under a scanning electron microscope) generally includes two to three PTFE particles 1 and an equal number of carbon particles 2, including their surfactant coatings 4. The sizes of these particles generally do not substantially exceed those of the "primary particle" shown in FIG. 1.

The gas-consumption dispersion of the present invention contributes to several advantages. For example, the resulting dispersion has been found to be very stable. The discrete, individual particles do not exhibit any tendency to agglomeration. Such dispersions permit either the subsequent coating of a finished electrode strip (for example, produced by the electrodeposit method of German Patent Specification 28 22 821) or a homogeneous addition to the active-mass paste for pasting individual electrodes. The dispersion not only reaches the outer geometry of the electrode surface, but also reaches the inner pores of the electrode as a result of the small size of the sandwiched particles. The result is that the coated, catalytically active surface area is markedly increased.

Suitable coating processes useful in accordance with the present invention are immersion jet coating, or free spraying. In all cases, a highly uniformly adjustable, reproducible layer thickness can be achieved.

Due to the microdispersity of the resulting system, and the intimate contact developed between the carbon and the PTFE support, electrodes coated with the dispersion of the present invention are notable for the durability of their hydrophobic nature and, consequently, for gas-consumption kinetics having long-term stability. The gas-consumption properties can be markedly improved by replacing the standard methylcellulose thickeners with other viscosity-increasing polymers which do not act as protective colloids.

In contrast to dry coatings, the electrolyte absorption of a cell is markedly improved by wet coating the negative electrode with a dispersion produced in accordance with the present invention. As a result, shorter processing times are made possible for the addition of electrolyte and, consequently, faster and more efficient cell production is made possible. A cell having an electrode coated in accordance with the present invention will exhibit a marked improvement in its fast charging capability and its overcharging capability, even after a large number of cycles. This also manifests itself in a markedly increased service life. Even after a large number of cycles, the cell will exhibit a virtually unaltered charging characteristic. As a result, switching off during overcharging (by means of a voltage difference signal) is made possible, even after a long operating life.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A negative electrode for a gastight alkaline storage battery having a carbon-black-containing gas-consumption layer which comprises a carbon black component including a mixture of an aqueous carbon black dispersion with an aqueous PTFE dispersion, and a surfactant in both dispersions which is uniformly either cationic, anionic or nonionic in type.

2. The negative electrode of claim 1 wherein the carbon black dispersion includes a polyacrylic acid ester as a thickening agent.

3. The negative electrode of claim 1 wherein the carbon black dispersion has a carbon black content of from 1 to 20%.

4. The negative electrode of claim 3 wherein the carbon black content is from 0.5 to 5%.

5. The negative electrode of claim 1 wherein the PTFE dispersion has a PTFE content of from 1 to 60%.

6. The negative electrode of claim 5 wherein the PTFE content is from 2 to 20%.

7. The negative electrode of claim 1 wherein the carbon black dispersion includes carbon black particles with a BET surface area of from 200 to 2000 $m^2/g$, and a primary particle size of from 0.001 to 0.1 μm.

8. The negative electrode of claim 7 wherein the primary particle size of the carbon black particles is from 0.01 to 0.07 μm.

9. The negative electrode of claim 1 wherein the PTFE dispersion includes PTFE particles with a primary particle size of from 0.01 to 0.5 μm.

10. The negative electrode of claim 9 wherein the primary particle size of the PTFE particles is from 0.05 to 0.2 μm.

11. A process for producing a negative electrode for a gastight alkaline storage battery, comprising the step of applying a mixture including a carbon black dispersion and a PTFE dispersion according to claim 1 to a surface of the negative electrode.

12. The process of claim 11 wherein the applying is performed by immersing the negative electrode into the mixture.

13. The process of claim 11 wherein the applying is performed by spraying the mixture onto the surface of the negative electrode.

14. The process of claim 11 which further includes the step of producing the mixture by mixing a carbon black dispersion and a PTFE dispersion.

15. The process of claim 14 wherein the producing step further includes mixing an additional thickening agent into the mixture.

16. The process of claim 14 wherein the producing step is performed without flocculation or coagulation.

* * * * *